US011520372B1

(12) United States Patent
Wang et al.

(10) Patent No.: US 11,520,372 B1
(45) Date of Patent: *Dec. 6, 2022

(54) TIME SYNCHRONIZATION USING SKEW ESTIMATION

(71) Applicant: Equinix, Inc., Redwood City, CA (US)

(72) Inventors: Lanfa Wang, Sunnyvale, CA (US); Danjue Li, Dublin, CA (US)

(73) Assignee: EQUINIX, INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,565

(22) Filed: Dec. 18, 2020

Related U.S. Application Data

(60) Provisional application No. 62/975,627, filed on Feb. 12, 2020.

(51) Int. Cl.
*G06F 1/12* (2006.01)
*G06F 1/10* (2006.01)

(52) U.S. Cl.
CPC . *G06F 1/12* (2013.01); *G06F 1/10* (2013.01)

(58) Field of Classification Search
CPC .................................... G06F 1/12; G06F 1/10
See application file for complete search history.

(56) References Cited

U.S. PATENT DOCUMENTS

| | | |
|---|---|---|
| 6,661,810 B1 | 12/2003 | Skelly et al. |
| 7,475,272 B2 | 1/2009 | Carlson et al. |
| 7,876,791 B2 | 1/2011 | Jung et al. |
| 8,384,590 B2 | 2/2013 | Huang et al. |
| 8,467,487 B2 | 6/2013 | Garner et al. |
| 8,549,341 B2 | 10/2013 | Shahid et al. |
| 8,644,348 B2 | 2/2014 | Zampetti |

(Continued)

FOREIGN PATENT DOCUMENTS

| | | |
|---|---|---|
| DE | 102017127431 A1 | 5/2018 |
| EP | 2947795 A1 | 11/2015 |
| WO | 2013048770 A1 | 4/2013 |

OTHER PUBLICATIONS

Mills et al., "Network Time Protocol Version 4: Protocol and Algorithms Specification," Internet Engineering Task Force (IEIF) RFC5905, Jun. 2010, 110 pp.

(Continued)

*Primary Examiner* — Stefan Stoynov
(74) *Attorney, Agent, or Firm* — Shumaker & Sieffert, P.A.

(57) ABSTRACT

Techniques are disclosed for performing time synchronization for a plurality of computing devices without relying upon a minimum measured delay. In one example, processing circuitry obtains time stamp data in accordance with an iteration of a synchronization operation for a timing protocol, wherein the time stamp data describes one or more measured delays for a path between a first computing device and a second computing device, computes a skewness estimate from the time stamp data using a regression analysis, the skewness estimate comprising a frequency difference between a first clock at the first computing device and a second clock at the second computing device, computes an offset estimate between the first clock and the second clock by applying a prediction model to the skewness estimate; and corrects at least one of the first clock or the second clock based at least on the offset estimate.

20 Claims, 8 Drawing Sheets

(56) References Cited

U.S. PATENT DOCUMENTS

| | | | |
|---|---|---|---|
| 8,705,578 | B2 | 4/2014 | Fang et al. |
| 9,515,756 | B2 | 12/2016 | Khoury et al. |
| 9,948,552 | B2 | 4/2018 | Teng et al. |
| 10,015,268 | B2 | 7/2018 | Rao |
| 2007/0061607 | A1* | 3/2007 | Carlson ............. G06F 1/10 713/503 |
| 2007/0147562 | A1 | 6/2007 | Eidson |
| 2010/0074383 | A1 | 3/2010 | Lee et al. |
| 2011/0064091 | A1 | 3/2011 | Darras et al. |
| 2014/0064303 | A1* | 3/2014 | Aweya ............. H04J 3/0667 370/509 |
| 2018/0145780 | A1* | 5/2018 | Zhao ............. H04J 3/0661 |
| 2019/0356402 | A1 | 11/2019 | Hummen et al. |

OTHER PUBLICATIONS

Shankarkumar et al., "Precision Time Protocol Version 2 (PTPv2) Management Information Base," Internet Engineering Task Force (IETF) RFC 8173, Jun. 2017, 64 pp.

Aoki et al., "Measurement Scheme for One-Way Delay Variation with Detection and Removal of Clock Skew," ETRI Journal, vol. 32, No. 6, Dec. 2010, 9 pp.

Pallares et al., "TS-MUWSN: Time Synchronization for Mobile Underwater Sensor Networks," IEEE Journal of Oceanic Engineering, vol. 41, No. 4, Oct. 2016, pp. 763-775.

Geng et al., "Self-Programming Networks: Architecture and Algorithms," Fifty-Fifth Annual Allerton Conference, Oct. 3-6, 2017, pp. 745-752.

"IEEE Standard for a Precision Clock Synchronization Protocol for Networked Measurement and Control Systems," EEE Instrumentation and Measurement Society, IEEE Std 1588-2008, Jul. 2008, 289 pp.

Mills et al., "Internet Time Synchronization: The Network Time Protocol," IEEE Transactions on Communications, vol. 39, No. 10, Oct. 1991, pp. 1482-1493.

Lee et al., "An Accuracy Enhanced IEEE 1588 Synchronization Protocol for Dynamically Changing and Asymmetric Wireless Links," IEEE Communications Letters, vol. 16, No. 2, Feb. 2012, pp. 190-192.

Chaloupka et al., "Clock Synchronization over Communication Paths with Queue-Induced Delay Asymmetries," IEEE Communications Letters, Sep. 2014, 5 pp.

Hajikhani et al. "A recursive method for bias estimation in asymmetric packet-based networks," IEEE, in Proc. IEEE Symp. Precis. Clock Synchronization Meas. Control Commun. (ISPCS), Sep. 22-26, 2014, 6 pp.

Wang et al., "A Nonlinear Model for Time Synchronization," arXiv.org: arXiv: 1903.00545, 2019 Workshop on Synchronization and Timing Services, Mar. 1, 2019, 7 pp.

Cortes et al., "Support-Vector Networks," Machine Learning, 20, Sep. 1995, pp. 273-297.

* cited by examiner

TIME SYNCHRONIZATION USING SKEW ESTIMATION

This application claims priority to U.S. provisional application No. 62/975,627 filed Feb. 12, 2020, the entire content of which is incorporated herein by reference.

TECHNICAL FIELD

This disclosure generally relates to time synchronization for computing systems.

BACKGROUND

A synchronization system, in general, synchronizes clocks of multiple devices based on the clock of a chosen master device (also referred to as a "primary" device or a "leader" device). The master device is a computing device that gets time synchronization data from other master devices or intelligent engines deployed either inside or outside of the synchronization system, such as a global positioning system (GPS). The master device maintains accurate clock information for other computing devices, which may be known as "slave" devices.

Time synchronization is the process of coordinating otherwise independent clocks, such as the clocks of computing devices connected on a network. Even when initially set accurately, real clocks will exhibit clock drift and differ after some amount of time due to the fact that even the most accurate clocks count time at slightly different rates. Time synchronization may be part of a timing protocol, such as IEEE 1588 Precision Time Protocol (PTP) and Network Time Protocol (NTP), in operation on the network for correcting differences between the clock of the chosen master device and the clock of a slave device. In network computing and distributed computing environments, each computing device must realize the same global time. Computing devices that are not accurately synchronized may treat the same event as happening in the past, concurrently, or in the future, thereby exhibit unpredictable and unreliable behavior. This is increasingly important in high-speed networking because there may be numerous inter-connected systems that depend on extremely precise timing to function correctly.

In many applications, including but not limited to financial, scientific, military, programmatic advertising, and gaming industries, time synchronization may be beneficial. For instance, such knowledge would be used to define trade orders in high-frequency trading systems and gamers response in multi-user games.

SUMMARY

In general, the present disclosure describes techniques for performing time synchronization for a plurality of computing devices that may measure a substantial network queuing delay when communicating data. Time synchronization, in general, refers to a process for correcting a clock offset at one or more computing devices. Conventional time synchronization techniques make a number of assumptions that may render any clock correction faulty, especially in response to the substantial network queuing delay. The present disclosure considers a substantial network queuing delay to be a non-linear distribution of the queuing delay.

Network timing protocols require accuracy when measuring delays between servers, especially a server having a master clock and another server operating as a slave, in order to perform a precise time synchronization. In contrast to other delays present in the network (e.g., transmission delays, propagation delays, etc.), the queuing delay varies from packet to packet and its probability distribution varies with network load as well. The clock offset is typically estimated in conventional solutions using a minimum measured delay. The queuing delay due to network functionality (i.e., queuing effect) induces uncertainty in the estimation of minimum delay and path asymmetry, which are the two major sources of errors in network timing protocols. The queuing delay dynamically changes even with constant network load. The present disclosure describes techniques to mitigate, and in some cases eliminate, such uncertainty and dynamic path asymmetry simultaneously.

As described herein, methods, systems, and devices are disclosed for performing time synchronization for a plurality of computing devices on a network that exhibits queuing delay effects along paths between the plurality of computing devices. In one example, a computing device obtains time-stamp data the indicates trip times for packets between a first computing device and a second computing device, computes a skewness estimate from the time stamp data using a regression analysis, and computes an offset estimate based upon a prediction model and the skewness estimate. As an example, the techniques may include applying, based on the value for the offset estimate along the bidirectional path, a time correction that adds/subtracts an amount of time to/from the first clock at the computing device. During the time correction, the actual amount of time being added to or subtracted from a current time of the first clock may or may not be equal to the offset estimate.

The techniques of the disclosure provide one or more specific technical improvements in the computer networks described herein. For instance, estimating the offset estimate from the regression analysis may be inaccurate, especially when the network exhibits queuing delay effects. For this reason, the above-mentioned methods, systems, and devices implement techniques that apply the prediction model, such as a machine learning model based upon true values of upper band and lower band of measured delays in the network.

Further, the techniques of the disclosure provide specific practical applications to the field of time synchronization for computer networks. For example, the techniques of the disclosure allow for calculating and accounting for queuing delay along bidirectional paths between clocks of a plurality of computing devices on a network. The techniques of the disclosure allow for the efficient calculation of the queuing delay, even during time periods of heavy network traffic or for an arbitrarily large network that has an arbitrarily large number of bidirectional paths between computing devices. Such techniques may allow for much more accurate time synchronization between the clocks of computing devices as compared to other methods.

In one example, this disclosure describes a method for time synchronization for a plurality of clocks on a network, comprising: obtaining, by processing circuitry of a computing device, time stamp data in accordance with an iteration of a synchronization operation for a timing protocol, wherein the time stamp data describes one or more measured delays for a path between a first computing device and a second computing device; computing, by the processing circuitry, a skewness estimate from the time stamp data using a regression analysis, the skewness estimate comprising a frequency difference between a first clock at the first computing device and a second clock at the second computing device; computing, by the processing circuitry, an offset estimate between the first clock and the second clock by applying a prediction model to the skewness estimate; and correcting at least one of the first clock or the second clock based at least on the offset estimate.

In another example, this disclosure describes a computing device comprising: computer memory; and processing circuitry coupled to the computer memory and configured to provide time synchronization for a plurality of clocks on a network for time synchronization for a plurality of clocks on a network, the processing circuitry operative to: obtain, by processing circuitry of a computing device, time stamp data in accordance with an iteration of a synchronization operation for a timing protocol, wherein the time stamp data describes one or more measured delays for a path between a first computing device and a second computing device; compute, by the processing circuitry, a skewness estimate from the time stamp data using a regression analysis, the skewness estimate comprising a frequency difference between a first clock at the first computing device and a second clock at the second computing device; compute, by the processing circuitry, an offset estimate for at least one of the first clock or the second clock by applying a prediction model to the skewness estimate; and correct at least one of the first clock or the second clock based at least on the offset estimate.

In another example, this disclosure describes a non-transitory computer-readable medium comprising executable instructions, that when executed by processing circuitry, cause a computing device to perform the method described above.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Real-world bidirectional paths between computing devices exhibit network queuing effects, which, if not accounted for during time synchronization for a timing protocol, may impair that time synchronization.

Various embodiments of the present disclosure implement techniques that enable precise time synchronization in real-time. Some techniques are configured to eliminate/mitigate timing errors from queuing delay variation in clock systems, particularly when there is heavy network traffic. Regarding the "queuing effect," the present disclosure refers to the queuing of packets, within network devices for instance, inducing dynamic variation of the queuing delay and/or an overall path delay. The distribution (e.g., a PDF) of the queuing delay is dynamic, indeterminant, and varies with the network traffic load. The heavier the network load, the more likely the queuing effect causes poor performance of the time synchronization process. The fact that the in-band traffic load differs from the out-band traffic load further exacerbates the queuing effect, rendering it almost impossible to accurately estimate a true path delay.

Figure 1:
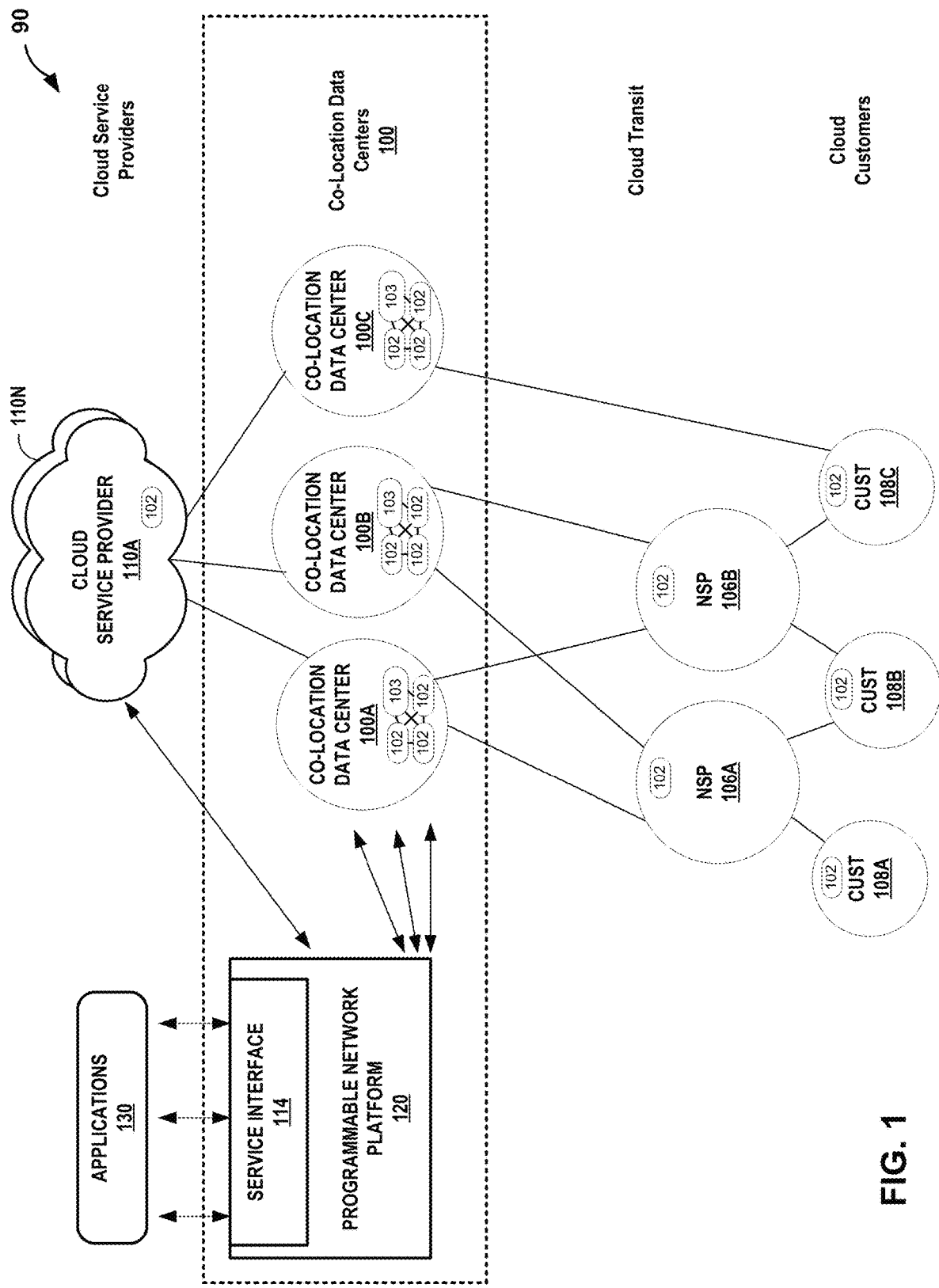
FIG. 1 is a block diagram illustrating an example system that performs time synchronization for a plurality of computing devices in a network exhibiting a queuing delay effect.

FIG. 1 is a block diagram illustrating an example system 90 that performs time synchronization for a plurality of computing devices (e.g., computing devices 102 and customer devices 108A-108C, hereinafter, "customer devices 108") that exhibit queuing delay between the plurality of computing devices. In general, a user such as customer 108A or a provider operator begins a user session with the portal application for engaging a co-location data center 100. As the user session makes service requests to various applications 130 within co-location data center 100, each of the applications 130 perform various sub-transactions to service the requests.

As illustrated by FIG. 1, co-location data centers 100A-100C ("co-location data centers 100") may provide an access point by which cloud-based services customers ("cloud customers") and cloud-based service providers ("cloud service providers") connect to receive and provide, respectively, cloud services. A co-location data center provider may deploy instances of co-location data centers 100 in multiple different metropolitan areas, each instance of co-location data center 100 having one or more co-location data center points (not depicted). A co-location data center may offer interconnection services, such as a cloud exchange, an Ethernet exchange, an Internet exchange, or cross-connections.

Co-location data centers 100 may include a cloud exchange and thus include network infrastructure and an operating environment by which cloud customers 108A-108C (collectively, "cloud customers 108") receive cloud services from multiple cloud service providers 110A-110N (collectively, "cloud service providers 110"). Cloud customers 108 may receive cloud services directly via a layer 3 peering and physical connection to co-location data centers 100 or indirectly via one of network service providers 106A-106B (collectively, "NSPs 106," or alternatively, "carriers 106"). NSPs 106 provide "cloud transit" by maintaining a physical presence within co-location data centers 100 and aggregating layer 3 access from one or customers 108.

NSPs 106 may peer, at layer 3, directly with co-location data centers 100, and in so doing, offer indirect layer 3 connectivity and peering to one or more customers 108 by which customers 108 may obtain cloud services from the cloud service providers 110. Co-location data centers 100, in the example of FIG. 1, are assigned an autonomous system number (ASN). Thus, co-location exchange points 129 are next hops in a path vector routing protocol (e.g., BGP) path from cloud service providers 110 to customers 108. As a result, any of co-location data centers 100 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 110 to customers. In other words, co-location data centers 100 may internalize the eBGP peering relationships that cloud service providers 110 and customers 108 would maintain on a pairwise basis. Rather, co-location data center 100 allows a customer 108 to configure a single eBGP peering relationship with co-location data centers 100 and receive, via the co-location data center, multiple cloud services from one or more cloud service providers 110. While described herein primarily with respect to eBGP or other layer 3 routing protocol peering between co-location data centers 100 and customer, NSP, or cloud service provider networks, co-location data centers 100 may learn routes from these networks in other way, such as by static configuration, or via Routing Information Protocol (RIP), Open Shortest Path First (OSPF), Intermediate System-to-Intermediate System (IS-IS), or other route distribution protocol.

In some examples, co-location data center 100 allows a corresponding one of customer customers 108A, 108B of any network service providers (NSPs) or "carriers" 106A-106B (collectively, "carriers 106") or other cloud customers including customers 108C to be directly cross-connected, via a virtual layer 2 (L2) or layer 3 (L3) connection to any other customer network and/or to any of CSPs 110, thereby allowing direct exchange of network traffic among the customer networks and CSPs 110.

Carriers 106 may each represent a network service provider that is associated with a transit network by which network subscribers of the carrier 106 may access cloud services offered by CSPs 110 via the co-location data center 100. In general, customers of CSPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such cloud services as are offered by the CSPs 110 via the co-location data center 100.

In this way, co-location data center 100 streamlines and simplifies the process of partnering CSPs 110 and customers (via carriers 106 or directly) in a transparent and neutral manner. One example application of co-location data center 100 is a co-location and interconnection data center in which CSPs 110 and carriers 106 and/or customers 108 may already have network presence, such as by having one or more accessible ports available for interconnection within the data center, which may represent co-location data centers 100. This allows the participating carriers, customers, and CSPs to have a wide range of interconnectivity options within the same facility. A carrier/customer may in this way have options to create many-to-many interconnections with only a one-time hook up to co-location data centers 100. In other words, instead of having to establish separate connections across transit networks to access different cloud service providers or different cloud services of one or more cloud service providers, co-location data center 100 allows customers to interconnect to multiple CSPs and cloud services.

Co-location data center 100 includes a programmable network platform 120 for dynamically programming a services exchange (e.g. a cloud exchange) of the co-location data center 100 to responsively and assuredly fulfill service requests that encapsulate business requirements for services provided by co-location data center 100 and/or cloud service providers 110 coupled to the co-location data center 100. The programmable network platform 120 as described herein may, as a result, orchestrate a business-level service across heterogeneous cloud service providers 110 according to well-defined service policies, quality of service policies, service level agreements, and costs, and further according to a service topology for the business-level service.

The programmable network platform 120 enables the cloud service provider that administers the co-location data center 100 to dynamically configure and manage the co-location data center 100 to, for instance, facilitate virtual connections for cloud services delivery from multiple cloud service providers 110 to one or more cloud customers 108. The co-location data center 100 may enable cloud customers 108 to bypass the public Internet to directly connect to cloud services providers 110 so as to improve performance, reduce costs, increase the security and privacy of the connections, and leverage cloud computing for additional applications. In this way, enterprises, network carriers, and SaaS customers, for instance, can at least in some aspects integrate cloud services with their internal applications as if such services are part of or otherwise directly coupled to their own data center network.

Programmable network platform 120 may represent an application executing within one or more data centers of the co-location data center 100 or alternatively, off-site at a back office or branch of the cloud provider (for instance). Programmable network platform 120 may be distributed in whole or in part among the co-location data centers 100.

In the illustrated example, programmable network platform 120 includes a service interface (or "service API") 114 that defines the methods, fields, and/or other software primitives by which applications may invoke the programmable network platform 120. The service interface 114 may allow carriers 106, customers 108, cloud service providers 110, and/or the co-location data center provider programmable access to capabilities and assets of the co-location data center 100.

For example, the service interface 114 may facilitate machine-to-machine communication to enable dynamic provisioning of virtual circuits in the co-location data center for interconnecting customer and cloud service provider networks. In this way, the programmable network platform 120 enables the automation of aspects of cloud services provisioning. For example, the service interface 114 may provide an automated and seamless way for customers to establish, de-install and manage interconnection with multiple, different cloud providers participating in the co-location data center.

Further example details of a services exchange, such as a cloud-based services exchange, can be found in U.S. Provisional Patent Application No. 62/149,374, filed Apr. 17, 2015 and entitled "Cloud-Based Services Exchange;" in U.S. Provisional Patent Application No. 62/072,976, filed Oct. 30, 2014 and entitled "INTERCONNECTION PLATFORM FOR REAL-TIME CONFIGURATION AND MANAGEMENT OF A CLOUD-BASED SERVICES EXCHANGE;" and in U.S. patent application Ser. No. 15/001,766 and entitled "MULTI-CLOUD, MULTI-SERVICE DATA MODEL," each of which are incorporated herein by reference in their respective entireties.

Applications 130 represent systems of engagement by which customers or internal operators for the co-locations data centers 100 may request services, request assets, request information regarding existing services or assets, and so forth. Each of applications 130 may represent a web portal, a console, a stand-alone application, an operator portal, a customer portal, or other application by which a user may engage programmable network platform 120.

In this example, each of co-location data centers 100 includes a set of computing devices 102, 103 that communicate via a network. In addition, co-located or other networks that receive interconnection and/or timing services from co-location data centers 100 may also include instances of computing devices 102. Networks associated with customers 108, NSPs 106, and cloud service providers 110 each include one or more instances of computing devices 102. Such networks may be co-located in one or more co-location data centers 100 or may have connections to the co-location data centers via an NSP connection, private connection, or other network connection. Accordingly, computing devices 102 located external to the co-location data centers 100 may receive timing services provided by timing servers of the co-location data centers 100.

Computing devices 102 may include storage systems and application servers that are interconnected via a high-speed switch fabric provided by one or more tiers of physical network switches and routers. For ease of illustration, FIG. 1 depicts three data centers 100A-100C, each of which has only a few computing devices 102. However, the techniques of the disclosure may be applied to large-scale networked systems that include dozens of data centers 100, each data center 100 having thousands of computing devices 102. Computing devices 102 may further include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other computing devices. In some examples, computing devices 102 may include top-of-rack switches, aggregation routers, and/or core routers.

Computing devices in a network may implement a time synchronization protocol to synchronize a clock of each computing device with clocks of other computing devices on the network (e.g., a network within system 90 or the Internet). For example, a network system may implement time synchronization protocol such as Network Time Protocol (NTP) or Precision Time Protocol (PTP) to perform time synchronization. Further information with regard to NTP is provided in "Network Time Protocol Version 4: Protocol and Algorithms Specification," RFC5905, Internet Engineering Task Force (IETF) (June 2010), available at https://tools.ietf.org/html/rfc5905, the entire content of which is incorporated by reference. Further information with regard to PTP is provided in "Precision Time Protocol Version 2 (PTPv2) Management Information Base," RFC 8173, Internet Engineering Task Force (IETF) (June 2017), available at https://tools.ietf.org/html/rfc8173, the entire content of which is incorporated by reference.

As an example, time synchronization protocols such as NTP or PTP implement a master computing device that acts as a reference clock to provide reference timing signals to slave computing devices that synchronize their system time to the system time of the master computing device. However, NTP and PTP suffer from some accuracy issues. For example, NTP and PTP assume a well-defined minimum measured delay and a constant queuing delay. However, real-world bidirectional paths between computing devices exhibit dynamic variations in queuing delay, especially during time periods of heavy network traffic in both directions. Furthermore, the minimum measured delay becomes less well-defined during heavy network traffic and NTP and PTP cannot rely upon traditional algorithms for time synchronization, which depend upon the minimum measured delay for clock offset estimation. If used, the minimum measured delay imposes error in time synchronization between two devices, limiting the precision with which clocks in a network may be synchronized to one another.

Master computing device 103 represents a computing device that is time server (i.e., master node) for a time synchronization protocol, while one or more computing devices 102 are slave nodes that receive time synchronization information from master computing device 103 with which to synchronize their local clocks to the master clock of master computing device 103.

In accordance with the techniques of the disclosure, a computing device, such as one of computing devices 102, master computing device 103, or another computing device, facilitates time synchronization for computing devices 102 that experience network queuing delay along paths from the master computing device 103 to computing devices 102.

The above-mentioned computing device may implement any of the techniques described herein. In one example, the computing device includes processing circuitry that obtains time stamp data in accordance with a synchronization operation for a timing protocol, computes a skewness estimate from the time stamp data using a regression analysis, the skewness estimate comprising a frequency difference between a first clock at the computing device and a second clock at another computing device, computes an offset estimate between the first clock and the second clock by applying a prediction model to the skewness estimate, and corrects the first clock at the computing device in accordance with the synchronization operation for the timing protocol. As one example, the computing device, using the offset estimate, applies a time correction to correct an offset of the first clock. This may involve adjusting a current time value of the first clock by a certain amount of time units (e.g., nanoseconds).

As described herein, employing the prediction model for computing the offset estimate instead of the regression analysis results in a more accurate offset estimate, especially during a time period of heavy network traffic. When the regression analysis targets the minimum delay (in accordance with traditional algorithms), the offset estimate deviates from an actual time difference between respective clocks due (in part) to a lack of actual measured delays/trip times around the minimum delay.

Traditional algorithms in conventional time synchronization solutions rely upon a minimum delay. In addition to the above description, there are a number of issues related to such reliance, especially during time periods of heavy network traffic. As noted herein, the minimum delay is not well defined when there is considerable queuing effect. It is important to note that application of a packet filter is not effective during such time periods of heavy network traffic; for one reason, the variation in the separation between pairs of packets can be significant and cannot be assumed to be constant.

The distribution of the queuing delay may play an important role in the estimation of clock offset and skewness. When the level of network traffic is heavy, network queuing effects start to play an important role and the distribution of queuing induced delays is dynamic (e.g., non-linear), which has strong dependence on both the traffic load and the configuration of overall network. Moreover, the minimum measured delay is no longer be clearly defined. The techniques described herein differ from conventional solutions by properly modeling the dynamic variation of the queuing delay and eliminating the uncertainty (i.e., errors) from relying upon the minimum measured delay.

Figure 2:
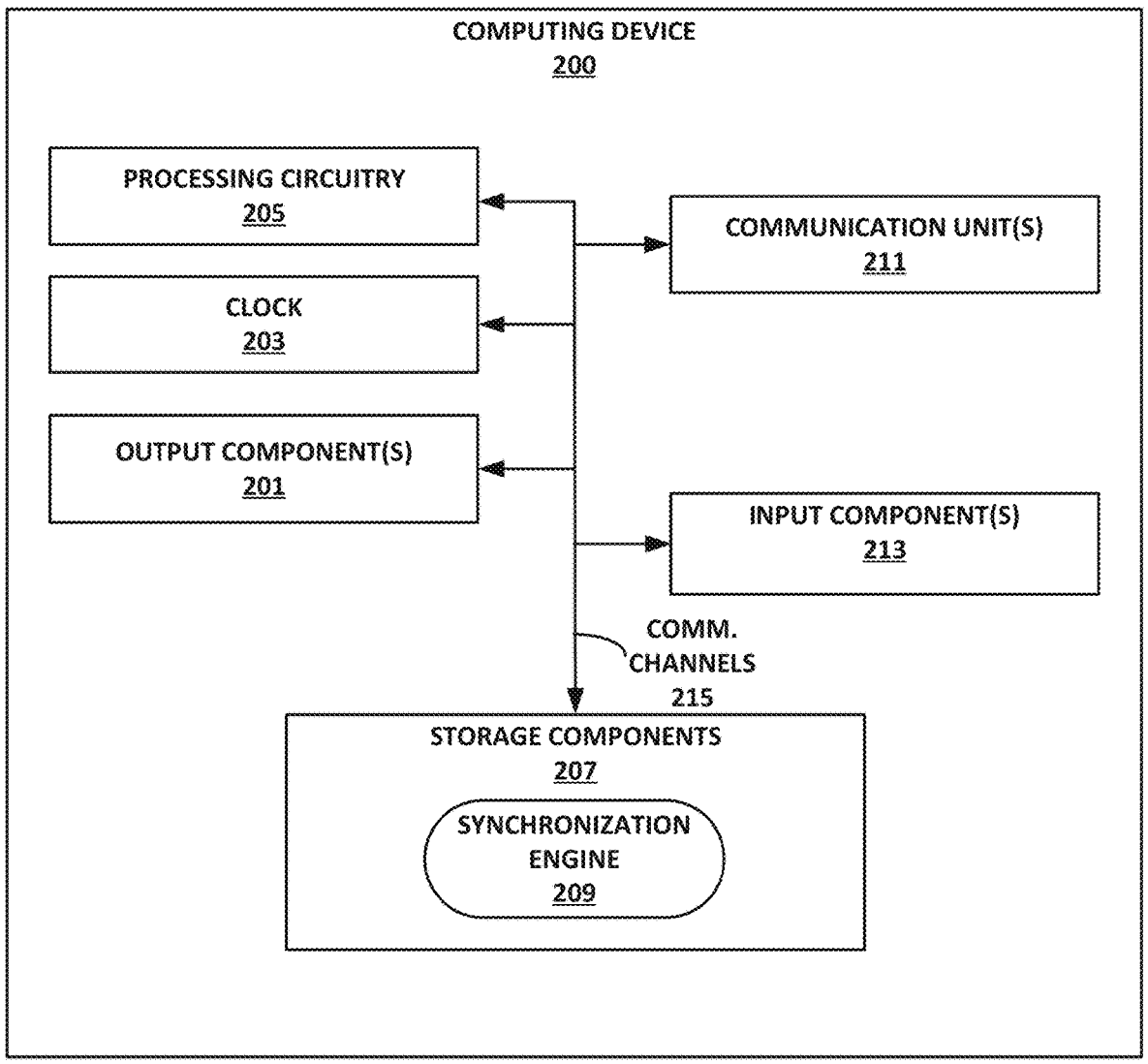
FIG. 2 is a block diagram illustrating an example computing device within one of the co-location data centers of FIG. 1 in accordance with one or more techniques of the disclosure.

FIG. 2 is a block diagram illustrating example computing device 200, in accordance with one or more techniques of the disclosure. Computing device 200 of FIG. 2 is described below as an example of one of computing devices 102 of FIG. 1 but may represent computing device 103 or another computing device that is not in the network path between a master and slave but instead receives time stamp data and computes offset correction and/or frequency correction data as described here. FIG. 2 illustrates only one example of computing device 200, and many other examples of computing device 200 may be used in other instances and may include a subset of the components included in example computing device 200 or may include additional components not shown in example computing device 200 of FIG. 2.

As shown in the example of FIG. 2, computing device 200 includes processing circuitry 205, one or more input components 213, one or more communication units 211, one or more output components 201, and one or more storage components 207. Storage components 207 of computing device 200 include emulation module 4 and modulation module 6. Communication channels 215 may interconnect each of the components 201, 203, 205, 207, 211, and 213 for inter-component communications (physically, communicatively, and/or operatively). In some examples, communication channels 215 may include a system bus, a network connection, an inter-process communication data structure, or any other method for communicating data.

One or more communication units 211 of computing device 200 may communicate with external devices, such another of computing devices 102 of FIG. 1, via one or more wired and/or wireless networks by transmitting and/or receiving network signals on the one or more networks. Examples of communication units 211 include a network interface card (e.g. such as an Ethernet card), an optical transceiver, a radio frequency transceiver, a GPS receiver, or any other type of device that can send and/or receive information. Other examples of communication units 211 may include short wave radios, cellular data radios, wireless network radios, as well as universal serial bus (USB) controllers.

One or more input components 213 of computing device 200 may receive input. Examples of input are tactile, audio, and video input. Input components 213 of computing device 200, in one example, includes a presence-sensitive input device (e.g., a touch sensitive screen, a PSD), mouse, keyboard, voice responsive system, video camera, microphone or any other type of device for detecting input from a human or machine. In some examples, input components 213 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like).

One or more output components 201 of computing device 200 may generate output. Examples of output are tactile, audio, and video output. Output components 201 of computing device 200, in one example, includes a PSD, sound card, video graphics adapter card, speaker, cathode ray tube (CRT) monitor, liquid crystal display (LCD), or any other type of device for generating output to a human or machine.

Processing circuitry 205 may implement functionality and/or execute instructions associated with computing device 200. Examples of processing circuitry 205 include application processors, display controllers, auxiliary processors, one or more sensor hubs, and any other hardware configure to function as a processor, a processing unit, or a processing device. Synchronization engine 209 may be operable by processing circuitry 205 to perform various actions, operations, or functions of computing device 200. For example, processing circuitry 205 of computing device 200 may retrieve and execute instructions stored by storage components 207 that cause processing circuitry 205 to perform the operations of Synchronization engine 209. The instructions, when executed by processing circuitry 205, may cause computing device 200 to store information within storage components 207.

One or more storage components 207 within computing device 200 may store information for processing during operation of computing device 200 (e.g., computing device 200 may store data accessed by Synchronization engine 209 during execution at computing device 200). In some examples, storage component 48 is a temporary memory, meaning that a primary purpose of storage component 48 is not long-term storage. Storage components 207 on computing device 200 may be configured for short-term storage of information as volatile memory and therefore not retain stored contents if powered off. Examples of volatile memories include random-access memories (RAM), dynamic random-access memories (DRAM), static random-access memories (SRAM), and other forms of volatile memories known in the art.

Storage components 207, in some examples, also include one or more computer-readable storage media. Storage components 207 in some examples include one or more non-transitory computer-readable storage mediums. Storage components 207 may be configured to store larger amounts of information than typically stored by volatile memory. Storage components 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 207 may store program instructions and/or information (e.g., data) associated with synchronization engine 209. Storage components 207 may include a memory configured to store data or other information associated with synchronization engine 209.

Clock 203 is a device that allows computing device 200 to measure the passage of time (e.g., track system time). Clock 203 typically operates at a set frequency and measures a number of ticks that have transpired since some arbitrary starting date. Clock 203 may be implemented in hardware and/or software.

In accordance with the techniques of the disclosure, synchronization engine 209 performs time synchronization for one or more computing devices 102 that experience queuing delay along paths from master computing device 103 to the computing devices 102.

The processing circuitry 205 may implement any of the techniques described herein. In one example, processing circuitry 205 obtains time stamp data in accordance with a synchronization operation for a timing protocol and computes a skewness estimate from the time stamp data using a regression analysis. In some examples, skewness refers to a frequency difference between a first clock at a first computing device and a second clock at a second computing device; and an estimate of that frequency difference may be a slope of the time stamp data such that, per each time step/interval, the first clock and the second clock drift apart by an amount of time defined by that estimate (if not clock correction occurs). The processing circuitry 205 computes an offset estimate based upon a prediction model and the skewness estimate, and correct the first clock at the first computing device in accordance with the synchronization operation for the timing protocol. In some examples, the prediction model refers to at least one mathematical function that accepts, as input, the skewness estimate and produces, as output, the offset estimate.

In some examples, clock 203 is a reference clock, and clocks of other computing devices 102 are slave clocks synchronized to clock 203. In such examples, synchronization engine 209 applies, based on the values for the offset estimate in each direction of a bidirectional path, a time correction to each of the slave clocks of other computing devices 102 to synchronize the slave clocks of other computing devices 102 with clock 203. In other examples, synchronization engine 209 executes a time correction for clock 203 by adjusting a time value given by clock 203 in accordance with the offset estimate; in one particular example, synchronization engine 209 may increase or decrease that time value by the offset estimate.

Figure 3A:
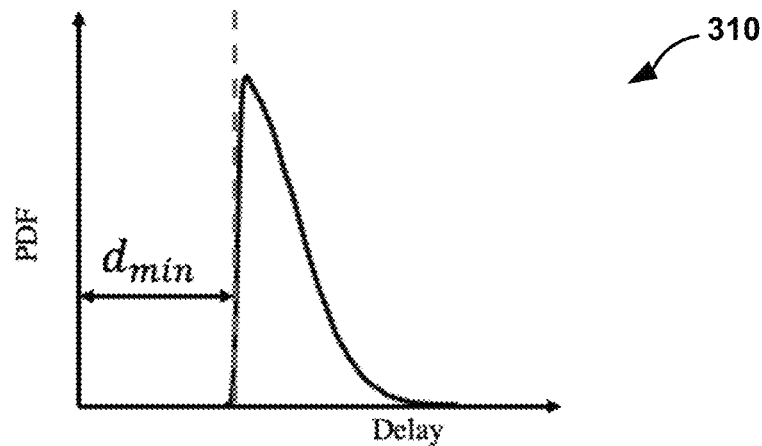
FIG. 3A is an example graph illustrating a probability density function (PDF) for packet delay in a network with minimal queuing delay effect and FIG. 3B is an example graph plotting distribution of packet delay in the same network.
Figure 3B:
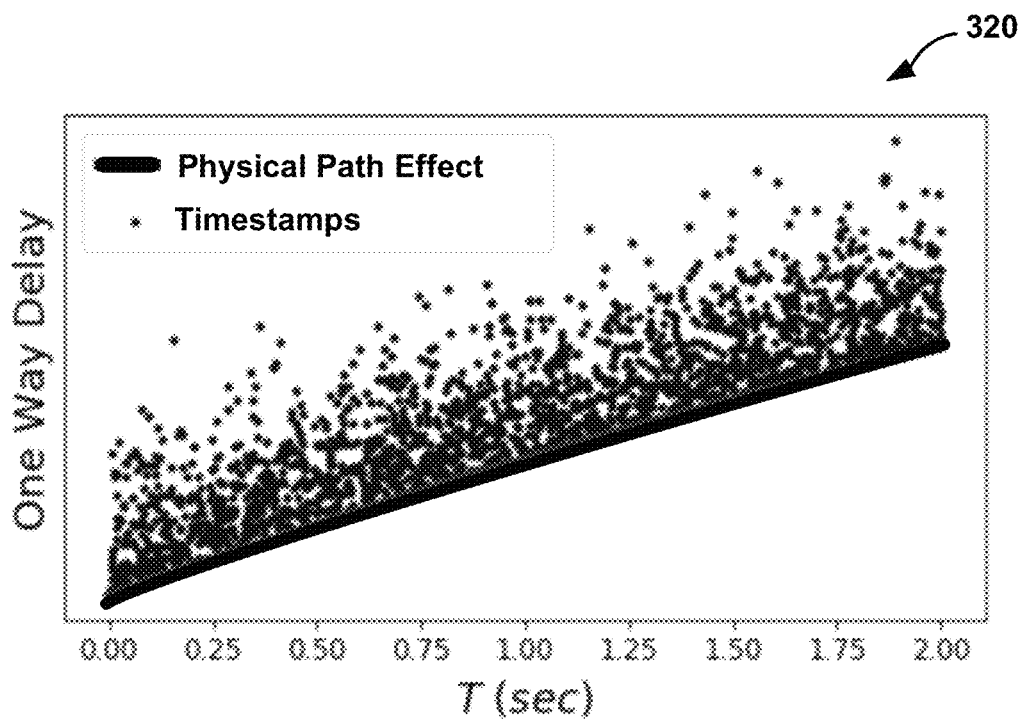

FIG. 3A is an example graph 310 illustrating a probability density function (PDF) for estimating a minimum delay in a network devoid of any queuing delay effect and FIG. 3B is an example graph 320 plotting skewness in the same network. Both graph 310 and graph 320 are generated from a data set of time stamp data. In this network, computing devices exchange data by communicating packets between each other. By capturing time stamp data indicating departure and arrival times for these packets, at least one of these computing devices may compute measured delays for clock correction/time synchronization. After accumulating a sufficient number of measured delays over a suitable time period, the techniques described herein enable a determination as to a level of network traffic in the network. In some examples, that determination dictates which synchronization algorithm to execute.

The following description discloses an example of such a determination where the network has a low network load and thus, exhibits little or no queuing delay effect. Based upon graph 310 and graph 320, there are a sufficient number of packets having a delay approximately around a minimum time value. Those packets are used to estimate the frequency difference (i.e., skewness) between the master and slave clocks by estimating a slope as shown in graph 320. Because the level of network traffic is low, the skewness can also be accurately estimated in addition to the minimum delay as a result.

In general, the PDF of graph 310 is a distribution of probabilities over a continuous domain of time values where each data point on graph 310 is a probability (p) of a given packet having an associated time value as a delay (d). In graph 310, not only is a particular minimum delay identifiable, the given packet is more likely to have a delay (d) around this particular minimum delay than a delay (d) around any other time value on an x-axis; and as the delay (d) along the x-axis increases, the associated probability (p) on an y-axis decreases considerably for the given packet. Hence, the minimum delay is at or near a peak of the PDF. The above-mentioned particular time value is approximately equal to a lowest measured delay in the time stamp data set. Because the distribution clearly defines a minimum delay, the PDF of graph 310 demonstrates that the network does not exhibit a queuing delay effect where the minimum delay is difficult to determine. In contrast, graph 310 indicates a substantial number of packets having approximately a same minimum delay and a trivial number of packets having a larger delay.

For the packets in the time stamp data, graph 320 plots measured delays in the above-mentioned time period (t). Over time value (t), graph 320 indicates a steady increase in the measured delays of all packets with very few packets as outliers. A measured delay of a given packet is very likely to be a data point following a physical path effect in graph 320. Hence, a slope defining the steady increase in the measured delays can easily be determined and that slope may be used as a skewness estimate.

Figure 4A:
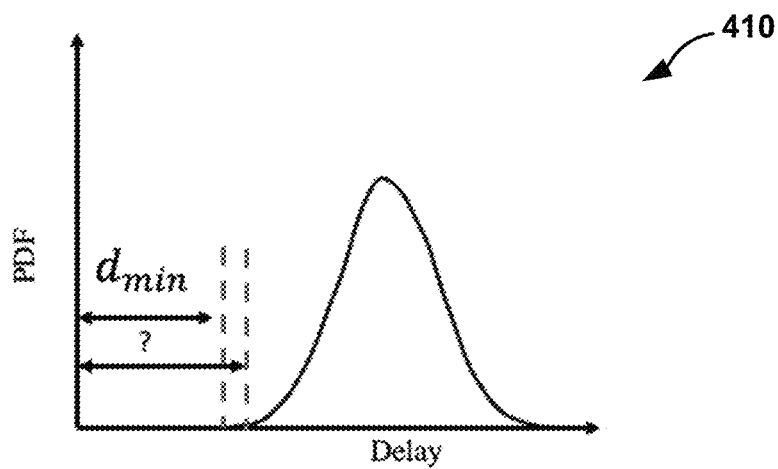
FIG. 4A is an example graph illustrating a probability density function (PDF) for packet delay in a network having significant queuing delay effect and FIG. 4B illustrates an example graph plotting distribution of packet delay in the same network.
Figure 4B:
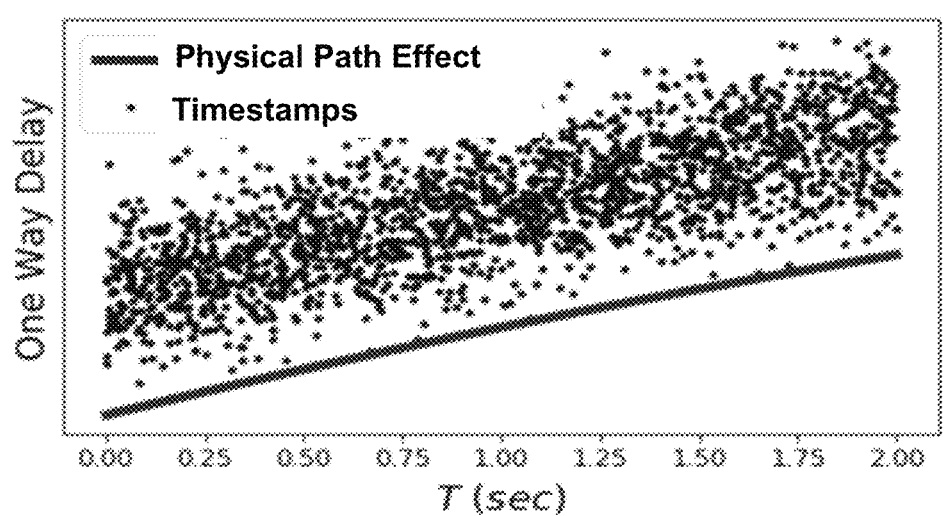

FIG. 4A is an example graph illustrating a probability density function (PDF) for estimating a minimum delay in a network having a queuing delay effect and FIG. 4B illustrates an example graph plotting skewness in the same network. As demonstrated by FIGS. 4A and 4B, the queuing delay effect is more pronounced during periods of heavy network traffic than periods of low network traffic.

Similar to graph 310 and graph 320 of FIG. 3A and FIG. 3B, graph 410 and graph 420 are generated from a data set consisting of time stamp data recording transmission/reception times of packets being communicated in any given network. These transmission/reception times may correspond to an iteration of a synchronization operation in accordance with a timing protocol. Computing devices in such a network may compute measured delays for these packets, for example, by determining a difference between timestamps corresponding to a transmission time and a reception time. Because of inaccurate clocks in these computing devices, this difference does not reflect an actual one-way time or round-trip time for communicating packets. The synchronization operation described herein synchronizes the inaccurate clocks with a reference clock after this iteration such that a next packet communication has an expected measured delay that more accurately reflects the actual one-way time.

During this iteration, after a certain time period in which a sufficient number of measured delays are captured, the techniques described herein enable a computing device to render a determination as to a level of network traffic in the network. Based upon this determination, programmable logic in this computing device provides a control directive instructing the device's networking hardware/software as to which time synchronization algorithm to execute.

The following description discloses an example of such a determination where the network has a level of heavy network traffic. While graph 410 does plot some data points around a minimum time value, by (visually) inspecting graph 410 and graph 420, it is clear that only a trivial number of packets have measured delays at or near that minimum time value. As opposed to a traditional time synchronization operation, those packets should not be used to estimate the frequency difference (i.e., skewness) between the master and slave clocks; for one reason, estimating a slope as shown in graph 420 would result in an inaccurate skewness. Hence, skewness should not be estimated using the minimum time value.

Instead, because of the heavy network traffic, the techniques described herein prescribe a different approach to time synchronization where skewness is estimated without relying upon a minimum delay computation. In some examples, after applying a regression analysis, a derivative or slope defining the increase over each time step ($\Delta t$) may be used to estimate a skewness. Skewness may be estimated and then, updated for each iteration of the synchronization operation. In some examples, the skewness estimate for one iteration differs from the skewness estimate from a previous iteration due to increases/decreases in a frequency difference between a first clock at the first computing device and a second clock at the second computing device. A rate at which measured delays change over time may differ between iterations.

In some examples, instead of finding a minimum path delay, the techniques described herein perform a linear regression analysis to accurately estimate the skewness s(n), which is the slope of the time stamp data. In some examples, the techniques described herein perform the regression analysis by capturing the time stamp data at each time step n and determining values for a number of variables such as a measured delay (d) for each packet. The regression analysis determines regression parameters that define a relationship between the measured delay (d) (i.e., a dependent variable) and time ($\Delta t$) (i.e., an independent variable). In the regression analysis, a function (e.g., $d=s(n)\Delta t+\Delta\theta(0)+error$) is determined, providing further context to the relationship between the measured delay and the time. A parameter $\Delta\theta(0)$ in the function denotes an initial clock offset for the measured delay at time t=0. Because a clock correction using $\theta(n)$ is applied prior to each iteration of the regression analysis, the skewness estimate s(n) may be calibrated after each iteration to more accurately define the change in measured delay over time.

After a number of iterations, the value of skewness s for a next time step n+1 will be well-defined and may be applied to a prediction model for estimating an offset for a next time step n+1. One example prediction model assumes that a function approximating an upper band $T_1$ or a lower band $T_2$ (for a next time step n+1) is a better estimator for the clock offset at time step n+1 than any other variable including the minimum delay $\hat{T}_1$ and $\hat{T}_2$. The prediction model may include a linear model in the form of $\hat{T}_1(n+1)=s(n)\Delta t+\hat{T}_1(n)+\theta(n))$ for determining an expected measured delay (e.g., an expected minimum delay). This linear model is transformed by way of other models to produce the prediction model for $\theta(n+1)$) as described herein.

Figure 5:
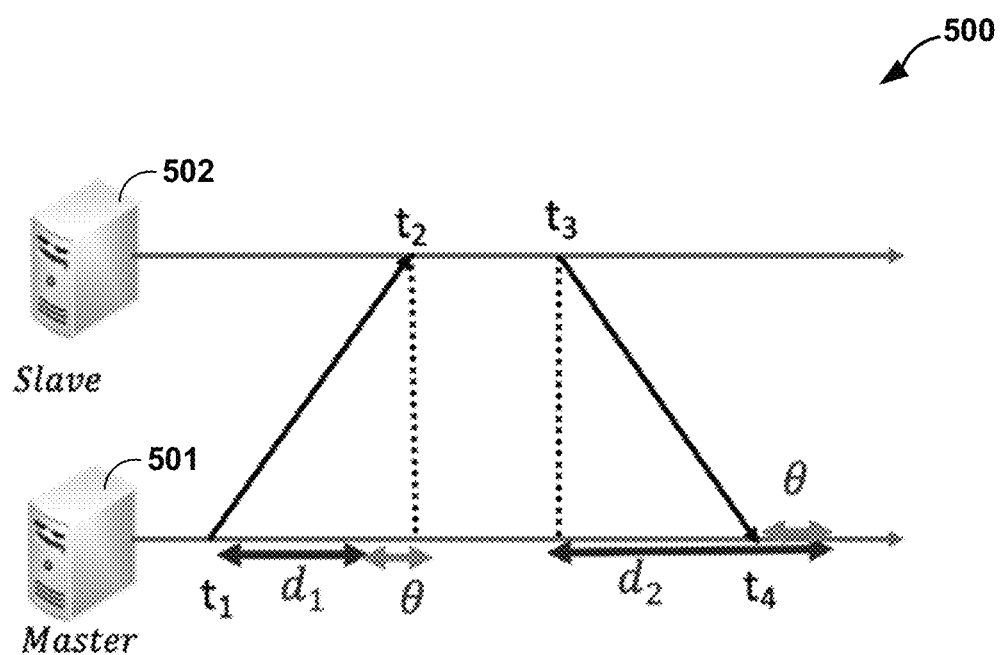
FIG. 5 is a block diagram illustrating signaling, packet delay, and the time difference for two-way communication between two computing devices in accordance with techniques of the disclosure.

FIG. 5 is a block diagram illustrating signaling, packet delay, clock offset, and the time difference for two-way communication between two computing devices (master 501 and slave 502).

Network queuing effects can negatively impact such two-way communication as well as time synchronization/clock correction as performed by timing protocols, such as NTP or PTP. As depicted in FIG. 5, the example synchronization scheme 500 between the two nodes, master 501 and slave 502, is performed. The measured delay from master 501 to slave 502 which may be defined as $d_1$, or the total time spent for a packet to go from master 501 to slave 502—generally is different from the measured delay from slave 502 to master 501—which may be defined as $d_2$, or the total time spent for a packet to go from slave 502 to master 501. Even if the path in reverse direction is similar, the total time spent for a packet to go from slave 502 to master 501 ($d_2$) may differ from the total time spent for a packet to go from master 501 to slave 502 ($d_1$). While FIG. 5 illustrates two-way communication, the following disclosure applies to a one-way scheme that can be applied in both directions.

Master 501 and slave 502 may be examples of computing device 200 of FIG. 2. In the example of FIG. 3, master 501 and slave 502 are connected via a bidirectional path (e.g., a path that allows signals to be sent in either direction along the path) along a network and perform their respective roles in an example synchronization scheme 500 in accordance with a timing protocol. Master 501 transmits a first timing signal (e.g., a packet) at timestamp $t_1$ according to the master 501 clock which is received by slave 502 at timestamp $t_2$ according to the slave 502 clock, the first timing signal requiring a measured delay or one-way trip time $d_1$. Slave 502 transmits a second timing signal at timestamp $t_3$ according to the slave 502 clock which is received by master 501 at timestamp $t_4$ according to the master 501 clock, the second timing signal requiring a trip time $d_2$. $\theta$ is the time difference between the slave 502 clock and the master 501 clock, or offset.

As discussed herein, regardless of path delay symmetry, time synchronization performed between master 501 and slave 502 may be inaccurate in view of queuing effects (i.e., delays) along network devices of the path or within master 501 and slave 502. Furthermore, when such a queueing effect is dynamic, further inaccuracy may be generated where the queuing effect changes in real time. Various forms of queuing effects may be impossible for conventional synchronization algorithms to correct. For example, a queueing effect along a path that occurs due to network traffic may induce dynamic variation in a resulting delay. Further, network traffic in-band to master 501 and out-band from master 501 may be different. Therefore, the different delay in this in-band and out-band traffic due to queueing may induce extra asymmetry in the path between computing devices 200. Conventional techniques may be unable to model such a dynamic queueing effect.

The present disclosure provides a number of techniques that, when implemented by a computing device, perform time synchronization by accurately estimating delays in a network having a dynamic queuing effect without relying upon a minimum delay estimation. Time synchronization in computing devices implementing the techniques described herein may be more precise than conventional time synchronization solutions.

Master 501, slave 502, and/or other computing device may execute at least some of the techniques described herein to synchronize the slave 502 clock to the master 501 clock. Some example techniques initialize certain variables such as measured delays that are initial one-way trip times $d_1(\theta)$ and $d_2(\theta)$. Therefore, an initial formula for computing an initial Round-Trip-Time (RTT) is $d_1(\theta)+d_2(\theta)$. Time synchronization operations may be performed after each round trip (i.e., iteratively) such that, variables for offset, skewness, and one-way trip times at time step n are: $\theta(n)$, $s(n)$, $d_1(n)$ and $d_2(n)$, respectively. At each time step, network packets storing time stamp data are collected. Instead of computing a minimum delay $\hat{T}_1$ or $\hat{T}_2$, the techniques described herein apply a regression process to accurately estimate the skewness $s(n)$, which is the slope of the time stamp data. For the offset $\theta(n)$, an upper band and a lower band estimated from the above regression are $T_1(n)$ and $T_2(n)$, but those estimates do not always reflect the actual minimum delay as illustrated in FIG. 5A. Mathematical relationships between the offset θ(n), one-way trip times $d_1(n)$ and $d_2(n)$, and the upper/lower bands $T_1(n)$ and $T_2(n)$ are leveraged by the prediction model to estimate the offset θ(n). With models representing these relationships, the prediction model replaces the models for estimating the minimum delay $\hat{T}_1$ or $\hat{T}_2$.

Therefore, while skewness is accurately estimated by the regression, the example techniques implement the prediction model described herein to accurately estimate the offset. In this manner, the example techniques described herein decouple the skewness estimation from offset estimation while refraining from relying upon the minimum delay.

Figure 6A:
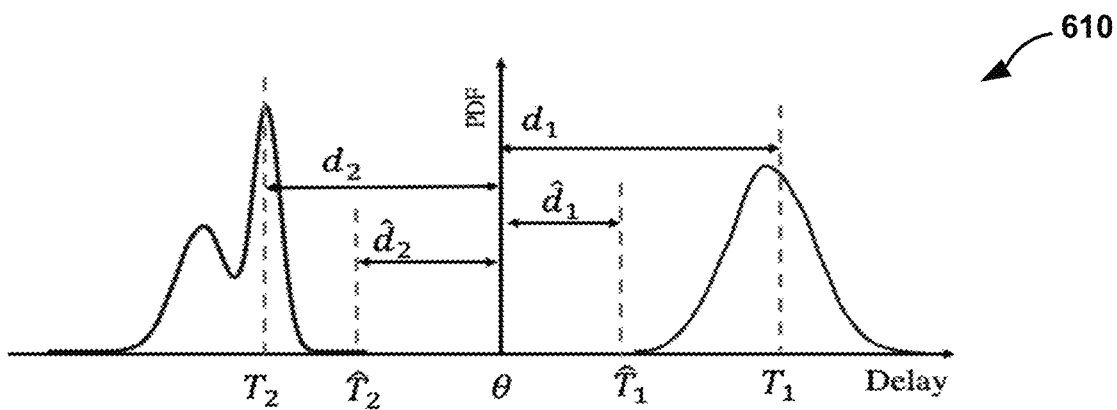
FIGS. 6A-6C are example graphs of probability density functions (PDFs) for of packet delay between master and slave clocks in networks with different traffic load in accordance with the techniques of the disclosure.
Figure 6B:
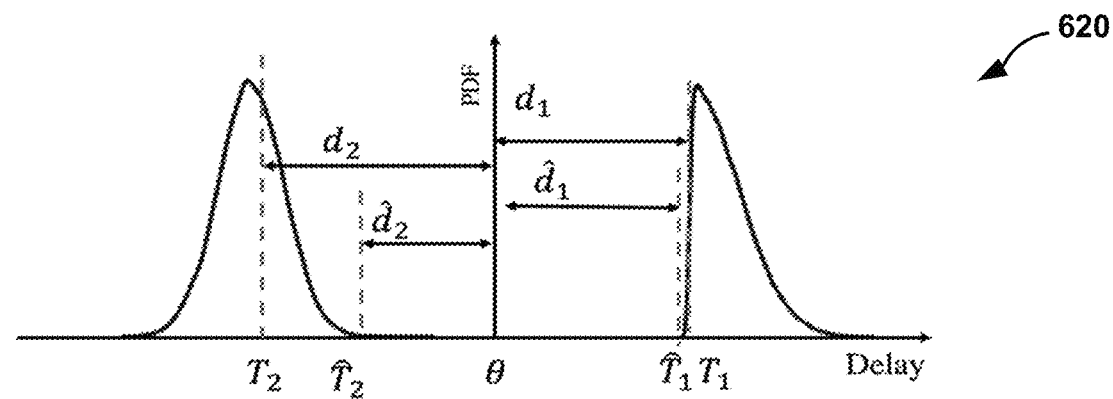
Figure 6C:
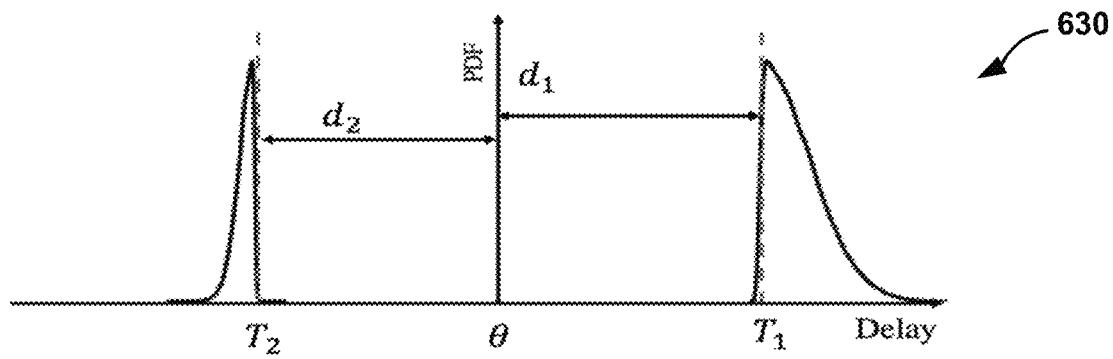

FIGS. 6A-6C are example graphs 610, 620, and 630 of probability density functions (PDFs) for queuing delays in an example network in accordance with the techniques of the disclosure. Similar to FIG. 5, FIGS. 6A-6C depict $d_1$ to represent a one-way trip time from the master to slave and $d_2$ to represent a one-way trip time for the reverse direction. Upper band $T_1$ refers to $t_1$-$t_2$ from FIG. 5 and lower band $T_2$ refers to $t_3$-$t_4$ from FIG. 5 and clock offset θ refers to a clock difference between the slave clock to the master clock. Upper band $T_1$ and lower band $T_2$ refers to an upper bound and a lower bound of a measured delay, respectively.

Figure 7:
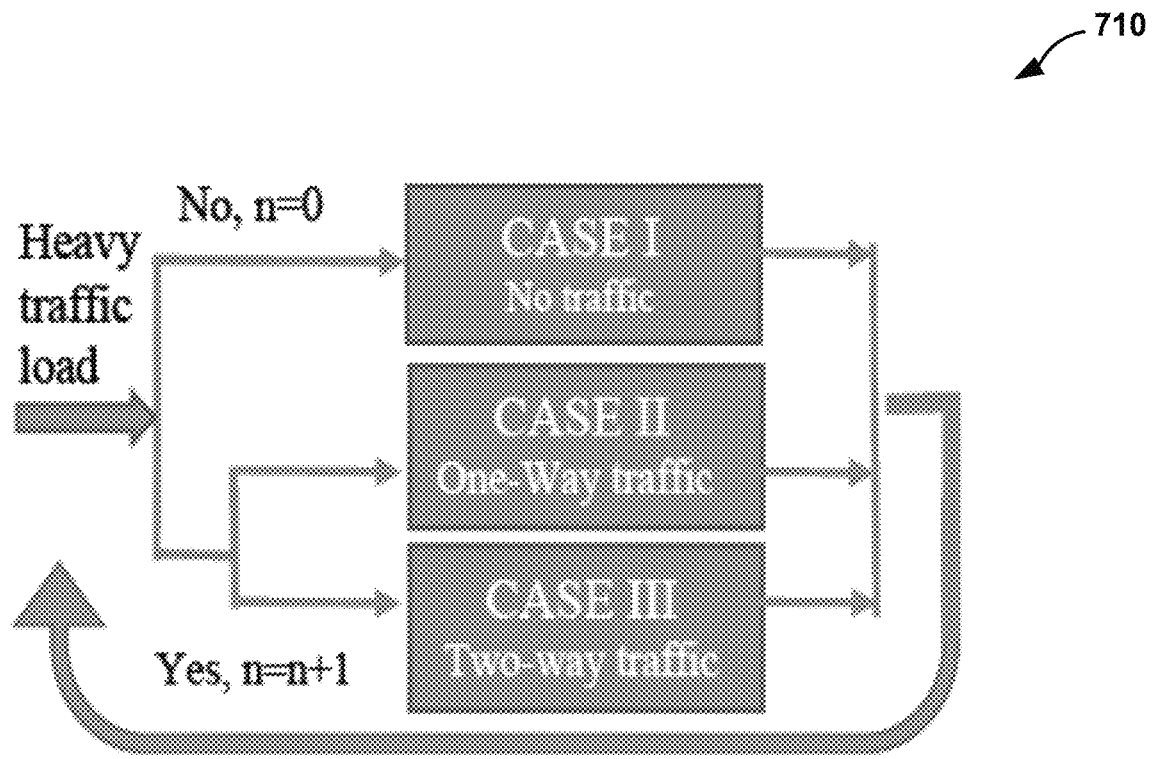
FIG. 7 illustrates an example flow for an example time synchronization operation between two computing devices of FIG. 1 in accordance with techniques of the disclosure.

FIG. 6A relates to case III of FIG. 7. FIG. 6A, in particular, provides probabilities for delays over a time of heavy network traffic between master and slave clocks with queuing effects. A synchronization engine executing at least one technique described herein computes a skewness estimate s(n) by way of a regression analysis and then computes an offset estimate 0(n) for synchronizing the master and slave clocks by applying a prediction model to the skewness estimate.

Given a level of heavy network traffic and/or a probability distribution similar to the one depicted in FIG. 6A, synchronization engine 209 from computing device 200 performs the following at time n+1 for a next iteration of the synchronization operation. During a time step (Δt), several packets have round trips between two network devices operating as a master and a slave combination and time stamp data stores arrival/departure times for the round trips by these packets. Synchronization engine 209 estimates, from the time stamp data, skewness s(n+1), upper band $T_1$(n+1) and lower band $T_2$(n+1) by way of a regression analysis. Due to the level of heavy network traffic, synchronization engine 209 cannot rely upon the clock offset, θ(n+1), estimated by way of a regression analysis. As established herein, values for $T_1$(n+1) and $T_2$(n+1) are not necessarily close to the minimum delay between master and slave clocks and therefore cannot be used to estimate the minimum delay (at time step n+1). For at least this reason, the minimum delay will not be relied upon for time synchronization (in contrast to conventional solutions). Instead, synchronization engine 209 applies a prediction model to predict the true value of $T_1$ and $T_2$ and ultimately, an offset for clock correction. The prediction model described herein includes a configuration of equations and/or functions for determining expected measured delays for both directions along a path. The upper and lower bands $T_1$ and $T_2$ may be estimated from expected measured delays $d_1$ and $d_2$.

An example linear model to predict the expected measured delays of includes the following equations:

$\hat{T}_1(n+1) = \hat{T}_1(n) + s(n) \cdot \Delta t + \Delta\theta(n)$ $\hat{T}_2(n+1) = \hat{T}_2(n) + s(n) \cdot \Delta t + \Delta\theta(n)$ For a non-linear model, the equations are:

$$\hat{T}_1(n+1) = \hat{T}_1(n) + s(n) \cdot \Delta t + \frac{1}{2}a(n)(\Delta t)^2 + \Delta\theta(n)$$

$$\hat{T}_2(n+1) = \hat{T}_2(n) + s(n) \cdot \Delta t + \frac{1}{2}a(n)(\Delta t)^2 + \Delta\theta(n)$$

Where Δθ is the correction of the clock time at each time interval for time synchronization. For a nonlinear model, the acceleration term a(n), the derivative of skewness with time, is included.

Initial values of variables $d_1$, $d_2$, $\hat{T}_1$, and $\hat{T}_2$ that are applicable to any of the above prediction models can be set-up through calibration or a model. Otherwise, these variables may be set during a low network traffic period. For instance, if the path is symmetric, then the initial values for these values can be set as the following:

$\hat{T}_1(0) = T_1(0)$ $\hat{T}_2(0) = T_2(0)$ $d_1(0) = d_2(0) = (T_1(0) - T_2(0))/2$ In order to improve the performance, mean values of $d_1$ and $d_2$ over a short time window can be used for initialization. In some example, if the length of fiber is asymmetric and known, it should be used in the estimation of $d_1$ and $d_2$. The one-way trip time is estimated as:

$d_1(n+1) = d_1(0) + \Delta d_1(n+1)$ $d_2(n+1) = d_2(0) + \Delta d_2(n+1)$ where $\Delta d_1(n+1) = T_1(n+1) - \hat{T}_1(n+1)$ $\Delta d_2(n+1) = T_2(n+1) - \hat{T}_2(n+1)$ The offset θ, one-way trip times $d_1$, $d_2$, and upper and lower bands $T_1$, and $T_2$ have the following relationship as shown in FIG. 5 and FIG. 6A:

$T_1(n+1) = d_1(n+1) + \theta(n+1)$ $-T_2(n+1) = d_2(n+1) - \theta(n+1)$

Therefore, the offset θ at time step n+1 is given by the following equations:

θ(n+1) = $T_1$(n+1) - $d_1$(n+1)

= $T_2$(n+1) + $d_2$(n+1)

To minimize measurement and numerical errors, the following example function for the offset θ estimation computes an average of the above two values:

$$\theta(n+1) = \frac{1}{2}[T_1(n+1) - d_1(n+1) + T_2(n+1) + d_2(n+1)]$$

When the two paths are perfectly symmetric, the above function becomes the standard precision timing protocol (PTP) offset function:

$$\theta(n+1) = \frac{1}{2}[T_1(n+1) + T_2(n+1)]$$

As follows, an alternative function utilizes the expected measured delay and an initial one-way trip time instead of the upper band and lower band because (in part) it can be proved that offset θ is independent of upper band $T_1(n+1)$:

$$\theta(n+1) = \hat{T}_1(n+1) - d_1(0)$$

In view of the above description, the techniques disclosed herein successfully decouple skewness estimation from offset estimation. As an additional improvement, there is no need to find the minimum path; instead, the dynamic path variation is handled accurately by the prediction through iterations. The techniques described herein provide an advantage over conventional solutions by removing the impact of uncertainty caused by an arbitrary selection for the offset when the minimum path cannot be clearly defined. The techniques described herein also eliminates the path asymmetry due to queuing effect. The techniques described herein commence time synchronization operations when there is low traffic load and/or the path is calibrated. In some examples, variations in one-way trip times are tracked separately.

There are two potential sources of errors for time synchronization in general: skewness estimation and offset estimation. The techniques described herein have nullified these error sources. The techniques described herein do not cause significant offset error in time periods of heavy network traffic, leaving skewness estimation as the only realistic error source. For at least this reason, a regression analysis may be used for skewness estimation only, leaving offset estimation to a prediction model. While skewness estimation errors are possible, the queuing effect for the most part affects variations in packet delay, having a trivial or negligible impact on the skewness. Hence, implementing the techniques described herein removes two potential sources of errors, significantly improving time synchronization.

The techniques described herein conserve storage space during time synchronization. This is due (in part) to the fact that there is no need to store all data for each step. Instead, only the initial value, the values of previous and current step are required. The estimation of offset in this method is calculate iteratively based on historical data.

Similar to FIG. 6A, FIGS. 6B-C are example graphs 620 and 630 of probability density functions (PDF) for measured delays in an example network in accordance with the techniques of the disclosure. Graph 620 of FIG. 6B, in particular, provides probabilities for delays between master and slave clocks with queuing effect over a time period encompassing a low traffic direction and a heavy traffic direction. In FIG. 6B, the queuing effect impacts only one direction. FIG. 6B relates to case II of FIG. 7.

Even though the minimum delay is well defined in one direction only, the techniques described herein dictate that a traditional algorithm involving the minimum delay be used. In some examples of such a traditional algorithm, a time synchronization engine running in either a master or a slave applies a Support Vector Machine (SVM) to find correct values for $T_1$, $T_2$, and s.

Since there is a high confidence level when estimating the delay in the low traffic direction, which is the right side of FIG. 6B, the time synchronization engine utilizes the following equation to estimate an accurate clock offset using information associated with the low traffic direction:

$$\theta(n+1) = T_1(n+1) - d_1(0)$$

In this case, $T_1$ and $\hat{T}_1$ should be relatively close in value and their difference can be used as an indicator of the error level of skewness estimation.

Graph 630 of FIG. 6C provides probabilities for delays between master and slave clocks over a time period encompassing low network traffic in both directions. FIG. 6C relates to case I of FIG. 7. In FIG. 6C, the network has a minimal or non-existent queuing effect.

In this case, a minimum delay is well defined such that a synchronization engine running on a master or a slave applies a traditional algorithm for time synchronization. In some example, skewness can also be estimated accurately using packets with minimum delay data. As mentioned above, one example traditional algorithm that involves the minimum delay utilizes a SVM to compute values for $T_1$, $T_2$, and s.

FIG. 7 illustrates an example flow for an example synchronization operation 710 between two computing devices of FIG. 1. Based upon an evaluation of network traffic along each path direction between the two computing devices, example time synchronization operation 710 determines which synchronization technique to apply: a traditional algorithm relying upon the minimum measured delay or an approach (described herein) that does not rely upon the minimum measured delay. Because example synchronization operation 710 may select between two approaches, example synchronization operation 710 may be considered a hybrid approach.

As depicted in FIG. 7, there are three possible cases involving different levels of network traffic. Each case includes a set of techniques to apply when performing time synchronization at a particular iteration (n) of time stamp data. Case I refers to a set of synchronization techniques that are applicable during time periods having little or no network traffic in both path directions between the two computing devices. In one example, Case I is represented by the graph of FIG. 7C and any technique described for FIG. 7C can be applied during time periods having little or no network traffic in both path directions.

Case II refers to a set of synchronization techniques that are applicable during time periods having network traffic in only one path direction between the two computing devices. In one example, Case II is represented by the graph of FIG. 7B and any technique described for FIG. 7B can be applied during time periods having network traffic in only one path direction. Case III refers to a set of synchronization techniques that are applicable during time periods having network traffic (e.g., heavy network traffic) in both path directions between the two computing devices. In one example, Case I is represented by the graph of FIG. 7A and any technique described for FIG. 7A can be applied during time periods having network traffic in both path directions.

Figure 8:
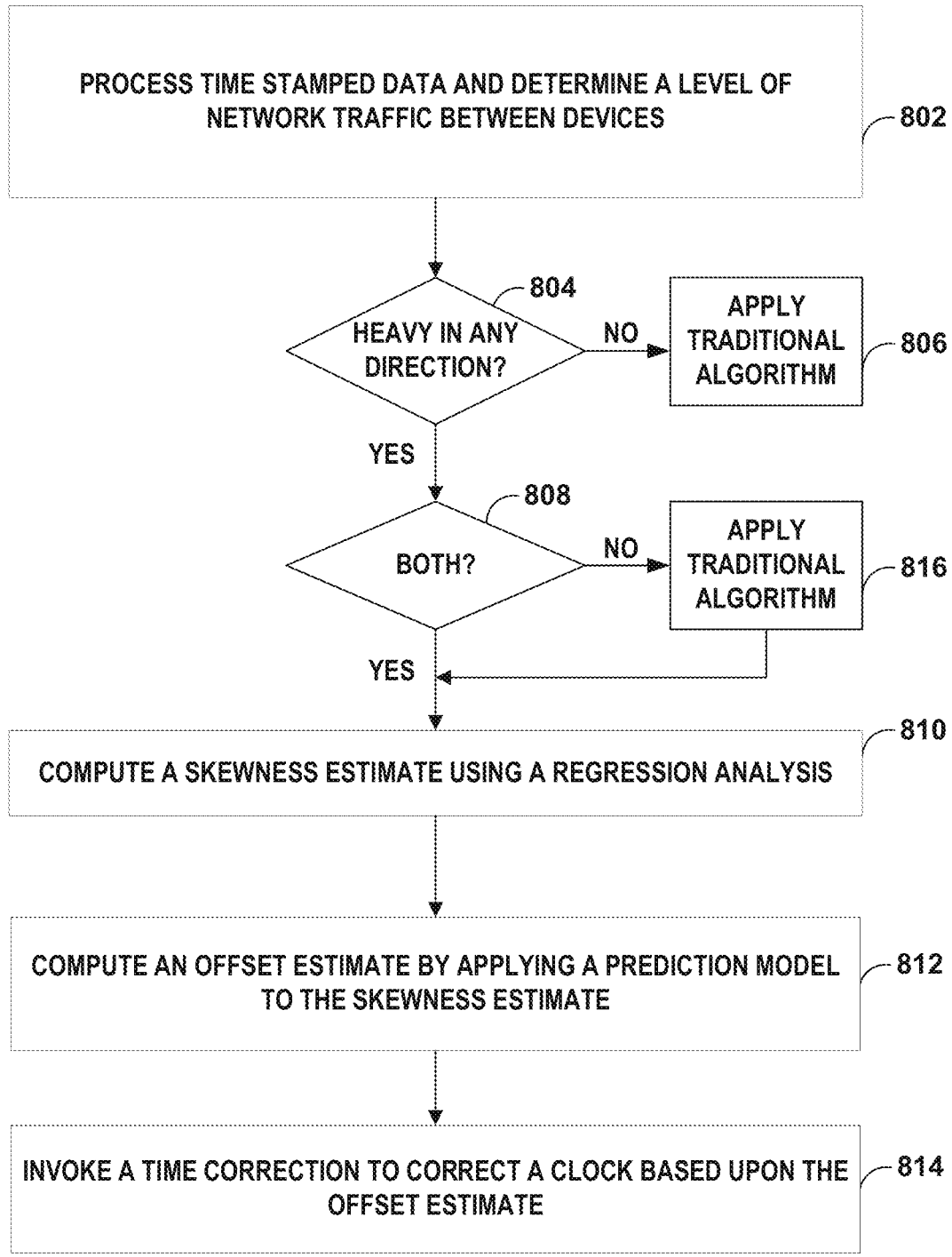
FIG. 8 is a flowchart illustrating an example operation for performing time synchronization for a plurality of computing devices without relying upon a minimum delay in accordance with techniques of the disclosure.

FIG. 8 is a flowchart illustrating an example time synchronization operation for a plurality of computing devices that exhibit queuing delay effects in accordance with the techniques of the disclosure. For convenience, FIG. 8 is described with respect to FIGS. 1 and 2.

In the example of FIG. 8, processing circuitry 205 processes time stamp data and determines a level of network traffic between computing devices (802). In general, network traffic refers to a measurement (e.g., a density) of protocol data units (e.g., network packets) being transmitted between devices over a time period. The time stamp data includes time stamps attributed to arrivals/departures of these protocol data units to/from computing devices in a network. From these time stamps, processing circuitry 205 determines (approximately) how many protocol data units are being transmitted through the network at a given moment as well as path delays for these transmissions. The determination of whether network traffic is heavy may be established by comparing latencies to a threshold that is determined from lowest-latencies or configured by an operator. In another example, network traffic may be classified as heavy network traffic when fewer than a threshold number of network packets have a path delay at or near a minimum time value amongst the path delays for the transmissions. In a PDF describing network traffic in the network, each data point is a probability (p) that a network packet has a corresponding time value as a path delay; if the probability for the minimum time value falls below a certain threshold (e.g., a threshold percentage), the network traffic may be considered heavy. Hence, a level of network traffic may be determined based upon a distribution of the PDF of measured delays in the network.

Processing circuitry 205 determines whether the level of network traffic is heavy is any direction (804). If the network does not have heavy network traffic in any direction (NO branch of 804), processing circuitry 205 proceeds to apply a traditional algorithm for time synchronization/clock correction (806). As described herein, the traditional algorithm is suitable when network traffic is not heavy. If a level of the network traffic is heavy in at least one direction (YES branch of 804), processing circuitry 205 proceeds to determine whether there is heavy network traffic in both directions (808).

If there is heavy network traffic along both directions (YES branch of 808), processing circuitry 205 computes a skewness estimate using a regression analysis (810) and then, computes an offset estimate by applying a prediction model to the skewness estimate (812) for each direction on the path. The skewness estimate may refer to a slope of the time stamp data. Processing circuitry 205 may utilize a linear or non-linear model, as described for FIGS. 5 and 6A, for determining (e.g., predicting) a value for each variable to be used in computing the offset estimate. One example variable is an expected measured delay ($\hat{T}_1$ (n+1) and/or $\hat{T}_2$ (n+1) at time step n+1) for each direction in the path. Another example variable may include an expected upper band $T_1(n+1)$ and/or an expected lower band $T_2$ (n+1) for measured delays during time step n+1. Yet another example variable may include an expected one-way trip time ($d_1$ (n+1) and $d_2$ (n+1) at time step n+1) for each direction. In some examples, processing circuitry 205 utilizes a following offset θ estimation function to compute an average of predicted values from the prediction model:

$$\theta(n+1) = \frac{1}{2}[T_1(n+1) - d_1(n+1) + T_2(n+1) + d_2(n+1)]$$

Processing circuitry 205 corrects the offset at a clock at the computing device by invoking a time correction to correct a clock based upon the offset estimate (814). In some examples, processing circuitry 205 adjusts, by the value for the offset estimate, a current time of a first clock of a first computing device and/or a third clock of a third computing device where the first computing device and a second computing device have slave and master roles, respectively; the third computing device may be any other computing device (e.g., a trusted/connected computing device to the first computing device). Within the first computing device, for instance, the above-mentioned time correction may be accomplished by a Proportional Integral Derivative (PID) feedback controller that receives, as input, the offset estimate and communicates, as output, clock adjustment information for the first clock. The PID controller may output a directive instructing the first clock to adjust the first clock's current time.

If, on the other hand, there is heavy network traffic along only one direction (NO branch of 808), processing circuitry 205 executes the traditional algorithm for time synchronization/clock correction (816) for the direction without heavy network traffic. As described herein, traditional algorithms rely upon a minimum measured delay to determine skewness and offset in a coupled fashion. Along the direction without heavy network traffic, the minimum delay is well-defined and therefore, suitable for the traditional algorithm's approach to computing skewness and then, using that skewness computation to determine the offset for correcting the clock 203 or another clock.

After applying the traditional algorithm along the direction without heavy network traffic, to perform time synchronization on the other direction with heavy network traffic, processing circuitry 205 proceeds to compute a skewness estimate using a regression analysis (810) and then, compute an offset estimate by applying a prediction model to the skewness estimate (812) for the path direction with heavy network traffic. The time synchronization engine 209 utilizes the following equation to estimate an accurate clock offset using information associated with the direction without heavy network traffic:

$$\theta(n+1) = T_1(n+1) - d_1(0).$$

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A method comprising:
obtaining, by processing circuitry of a computing device, time stamp data in accordance with an iteration of a synchronization operation for a timing protocol, wherein the time stamp data describes one or more measured delays for a path between a first computing device and a second computing device;
computing, by the processing circuitry, a skewness estimate from the time stamp data using a regression analysis, the skewness estimate comprising a frequency difference between a first clock at the first computing device and a second clock at the second computing device;
computing, by the processing circuitry, an offset estimate between the first clock and the second clock by applying a prediction model to the skewness estimate; and
correcting at least one of the first clock or the second clock based at least on the offset estimate.

2. The method of claim 1, further comprising:
determining, by the processing circuitry, a level of network traffic between the first computing device and the second computing device of the network.

3. The method of claim 2, wherein computing the skewness estimate and computing the offset estimate are in response to determining the level of network traffic exceeds a threshold.

4. The method of claim 1, further comprising:
correcting, by the processing circuitry, a third clock at a third computing device based at least on the offset estimate.

5. The method of claim 1, wherein computing the offset estimate further comprises:
determining an expected measured delay for a next iteration of the synchronization operation; and
determining the offset estimate based on the expected measured delay and a one-way trip time for the path.

6. The method of claim 1, wherein the prediction model comprises a linear model for estimating at least one delay in the path according to:

$$\hat{T}_1(n+1) = \hat{T}_1(n) + s(n) \cdot \Delta t + \Delta \theta(n),$$

wherein:
$\hat{T}_1$ comprises an expected one-way delay,
n comprises an index of a time step,
s comprises a skewness estimate,
t comprises a time value, and
θ comprises a clock offset.

7. The method of claim 1, wherein the prediction model comprises a non-linear model for estimating at least one delay in the path according to:

$$\hat{T}_1(n+1) = \hat{T}_1(n) + s(n) \cdot \Delta t + \frac{1}{2} a(n)(\Delta t)^2 + \Delta \theta(n),$$

wherein:
$\hat{T}_1$ comprises an expected one-way delay,
n comprises an index of a time step,
s comprises a skewness estimate,
t comprises a time value,
a comprises an acceleration term, and
θ comprises a clock offset.

8. The method of claim 1, wherein the prediction model comprises a function for computing the offset estimate based on a minimum delay and an initial one-way trip time, the function according to:

$$\theta(n+1) = \hat{T}_1(n+1) - d_1(0),$$

wherein:
θ comprises a clock offset,
n comprises an index of a time step,
$\hat{T}_1$ comprises an expected one-way delay, and
$d_1$ comprises a measured one-way delay.

9. The method of claim 1, wherein the prediction model comprises a function for computing the offset estimate from an upper band for measured delays in the path, the function according to:

$$\theta(n+1) = \frac{1}{2}[T_1(n+1) - d_1(n+1) + T_2(n+1) + d_2(n+1)],$$

wherein:
θ comprises a clock offset,
n comprises an index of a time step,
$T_1$ comprises an upper band of a measured one-way delay,
$d_1$ comprises a first measured one-way delay from a first device to a second device,
$T_2$ comprises a lower band of a measured one-way delay, and
$d_2$ comprises a second measured one-way delay from the second device to the first device.

10. The method of claim 1, wherein the prediction model comprises variables for a minimum delay in each path direction, an upper band and a lower band for measured delays, and a measured delay, the variables having initial values set to:

$$\hat{T}_1(0) = T_1(0);$$

$$\hat{T}_2(0) = T_2(0); \text{ and}$$

$$d_1(0) = d_2(0) = (T_1(0) - T_2(0))/2,$$

wherein:
$\hat{T}_1$ comprises a first expected one-way delay,
$T_1$ comprises an upper band of a measured delay,
$\hat{T}_2$ comprises a second expected one-way delay,
$T_2$ comprises a lower band of a measured delay,
$d_1$ comprises a first measured one-way delay from a first device to a second device, and
$d_2$ comprises a second measured one-way delay from the second device to the first device.

11. The method of claim 1, wherein the prediction model comprises variables for a minimum delay in each path direction, an upper band and a lower band for measured delays, and a measured delay, the variables having values at a next time step (n+1) being estimated according to:

$$d_1(n+1) = d_1(0) + \Delta d_1(n+1),$$

$$d_2(n+1) = d_2(0) + \Delta d_2(n+1),$$

where:

$$\Delta d_1(n+1) = T_1(n+1) - \hat{T}_1(n+1) \text{ and } \Delta d_2(n+1) = T_2(n+1) - \hat{T}_2(n+1);$$

$$T_1(n+1) = d_1(n+1) + \theta(n+1) \text{ and } -T_2(n+1) = d_2(n+1) - \theta(n+1),$$

wherein:
n comprises an index of a time step,
$d_1$ comprises a first measured one-way delay from a first device to a second device,
$d_2$ comprises a second measured one-way delay from the second device to the first device,
$T_1$ comprises an upper band of a measured delay,
$\hat{T}_1$ comprises a first expected one-way delay,
$T_2$ comprises a lower band of a measured delay,
$\hat{T}_2$ comprises a second expected one-way delay, and
θ comprises a clock offset.

12. The method of claim 1, wherein the prediction model comprises a variable for the offset estimate minimum delay in each path direction, the variable having a value being estimated with an equation according to:

$$\theta(n+1)=T_1(n+1)-d_1(n+1)=T_2(n+1)+d_2(n+1),$$

wherein:
n comprises an index of a time step,
θ comprises a clock offset,
$T_1$ comprises an upper band of a measured delay,
$d_1$ comprises a first measured one-way delay from a first device to a second device,
$T_2$ comprises a lower band of a measured delay, and
$d_2$ comprises a second measured one-way delay from the second device to the first device.

13. A computing device comprising:
computer memory; and
processing circuitry coupled to the computer memory and configured to provide time synchronization for a plurality of clocks on a network, the processing circuitry operative to:
obtain time stamp data in accordance with an iteration of a synchronization operation for a timing protocol, wherein the time stamp data describes one or more measured delays for a path between a first computing device and a second computing device;
compute a skewness estimate from the time stamp data using a regression analysis, the skewness estimate comprising a frequency difference between a first clock at the first computing device and a second clock at the second computing device;
compute an offset estimate for at least one of the first clock or the second clock by applying a prediction model to the skewness estimate; and
correct at least one of the first clock or the second clock based at least on the offset estimate.

14. The computing device of claim 13, wherein the processing circuitry is further operative to:
determine a level of network traffic between the first computing device and the second computing device.

15. The computing device of claim 14, wherein to compute the skewness estimate and to compute the offset estimate, the processing circuitry is further operative to:
compute the skewness estimate and compute the offset estimate in response to a determination that the level of network traffic exceeds a threshold.

16. The computing device of claim 13, wherein the processing circuitry is further operative to:
correct a third clock at a third computing device based at least on the offset estimate.

17. The computing device of claim 13, wherein to compute the offset estimate, the processing circuitry is further operative to:
determine an expected measured delay for a next iteration of the synchronization operation; and
determine the offset estimate based upon the expected measured delay and a one-way trip time for the path.

18. The computing device of claim 13, wherein the prediction model comprises a linear model for estimating at least one delay in the path according to:

$$\hat{T}_1(n+1)=\hat{T}_1(n)+s(n)\cdot\Delta t+\Delta\theta(n),$$

wherein:
$\hat{T}_1$ comprises an expected one-way delay,
n comprises an index of a time step,
s comprises a skewness estimate,
t comprises a time value, and
θ comprises a clock offset.

19. The computing device of claim 13, wherein the prediction model comprises a non-linear model for estimating at least one delay in the path according to:

$$\hat{T}_1(n+1) = \hat{T}_1(n) + s(n)\cdot\Delta t + \frac{1}{2}a(n)(\Delta t)^2 + \Delta\theta(n),$$

wherein:
$\hat{T}_1$ comprises an expected one-way delay,
n comprises an index of a time step,
s comprises a skewness estimate,
t comprises a time value,
a comprises an acceleration term, and
θ comprises a clock offset.

20. A non-transitory computer-readable medium comprising executable instructions configured to provide time synchronization for a plurality of clocks on a network, that when executed by processing circuitry, cause a computing device to:
obtain time stamp data in accordance with an iteration of a synchronization operation for a timing protocol, wherein the time stamp data describes one or more measured delays for a path between a first computing device and a second computing device;
compute a skewness estimate from the time stamp data using a regression analysis, the skewness estimate comprising a frequency difference between a first clock at the first computing device and a second clock at the second computing device;
compute an offset estimate for at least one of the first clock or the second clock by applying a prediction model to the skewness estimate; and
correct at least one of the first clock or the second clock based at least on the offset estimate.

* * * * *